United States Patent
Cheng et al.

(10) Patent No.: US 9,620,150 B2
(45) Date of Patent: Apr. 11, 2017

(54) DEVICES INCLUDING AN AMORPHOUS GAS BARRIER LAYER

(71) Applicant: SEAGATE TECHNOLOGY LLC, Cupertino, CA (US)

(72) Inventors: Yuhang Cheng, Edina, MN (US); Kurt W. Wierman, Eden Prairie, MN (US); Michael Seigler, Eden Prairie, MN (US); Xiaoyue Huang, Eden Prairie, MN (US); Scott Franzen, Savage, MN (US)

(73) Assignee: Seagate Technology LLC, Cupertino, CA (US)

(*) Notice: Subject to any disclaimer, the term of this patent is extended or adjusted under 35 U.S.C. 154(b) by 0 days.

(21) Appl. No.: 14/918,687

(22) Filed: Oct. 21, 2015

(65) Prior Publication Data

US 2016/0133277 A1    May 12, 2016

Related U.S. Application Data

(60) Provisional application No. 62/078,113, filed on Nov. 11, 2014.

(51) Int. Cl.

| | | |
|---|---|---|
| G11B 11/00 | (2006.01) | |
| G11B 5/31 | (2006.01) | |
| C23C 8/10 | (2006.01) | |
| C23C 8/02 | (2006.01) | |
| C23C 8/80 | (2006.01) | |
| G11B 5/00 | (2006.01) | |

(52) U.S. Cl.
CPC ........... *G11B 5/314* (2013.01); *C23C 8/02* (2013.01); *C23C 8/10* (2013.01); *C23C 8/80* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 4,492,873 A | 1/1985 | Dmitriev et al. | |
| 5,482,611 A | 1/1996 | Helmer et al. | |
| 5,582,947 A * | 12/1996 | Shirai | G03G 5/08228 257/E31.094 |
| 5,849,093 A | 12/1998 | Andra | |
| 5,945,681 A | 8/1999 | Tokiguchi et al. | |
| 6,130,436 A | 10/2000 | Renau et al. | |
| 6,144,098 A | 11/2000 | Iyer | |

(Continued)

FOREIGN PATENT DOCUMENTS

| | | |
|---|---|---|
| EP | 024088 | 10/1987 |
| EP | 0 580 368 A2 | 1/1994 |

(Continued)

OTHER PUBLICATIONS

U.S. Appl. No. 13/923,925, filed Jun. 21, 2013, Pitcher.

(Continued)

*Primary Examiner* — Peter Vincent Agustin
(74) *Attorney, Agent, or Firm* — Mueting, Raasch & Gebhardt, P.A.

(57) ABSTRACT

Devices that include a near field transducer (NFT); an amorphous gas barrier layer positioned on at least a portion of the NFT; and a wear resistance layer positioned on at least a portion of the gas barrier layer.

20 Claims, 5 Drawing Sheets

(56) References Cited

U.S. PATENT DOCUMENTS

| | | | |
|---|---|---|---|
| 6,304,527 B1* | 10/2001 | Ito | B82Y 20/00 369/112.01 |
| 6,589,676 B1 | 7/2003 | Gui et al. | |
| 6,632,483 B1 | 10/2003 | Cesare Callegari et al. | |
| 6,641,932 B1 | 11/2003 | Xu et al. | |
| 6,683,426 B1 | 1/2004 | Kleeven | |
| 6,839,306 B1* | 1/2005 | Hajjar | G11B 7/0938 369/13.33 |
| 7,018,729 B2 | 3/2006 | Pocker | |
| 7,377,228 B2 | 5/2008 | Mack | |
| 7,476,855 B2 | 1/2009 | Huang | |
| 8,040,761 B2 | 10/2011 | Kawamori | |
| 8,351,151 B2 | 1/2013 | Katine | |
| 8,400,902 B2 | 3/2013 | Huang | |
| 8,427,925 B2 | 4/2013 | Zhao | |
| 8,830,800 B1 | 9/2014 | Pitcher | |
| 8,867,322 B1* | 10/2014 | Chernyshov | G11B 5/7325 360/131 |
| 8,902,720 B1* | 12/2014 | Schreck | G11B 5/3106 369/112.27 |
| 8,923,100 B1* | 12/2014 | Wessel | G11B 5/6088 369/112.27 |
| 9,058,824 B2* | 6/2015 | Cheng | G11B 5/4866 |
| 9,165,576 B2* | 10/2015 | Cheng | G11B 5/4866 |
| 2005/0012052 A1 | 1/2005 | Platzgummer | |
| 2006/0238133 A1 | 10/2006 | Horsky | |
| 2008/0230724 A1 | 9/2008 | Low | |
| 2010/0123965 A1 | 5/2010 | Lee | |
| 2010/0123967 A1 | 5/2010 | Batra | |
| 2010/0190036 A1 | 7/2010 | Komvopoulos | |
| 2010/0320403 A1 | 12/2010 | Amaldi | |
| 2010/0329085 A1 | 12/2010 | Kawamori | |
| 2011/0006214 A1 | 1/2011 | Bonig | |
| 2011/0026161 A1 | 2/2011 | Ikeda | |
| 2011/0096431 A1 | 4/2011 | Hellwig | |
| 2011/0205863 A1* | 8/2011 | Zhao | B82Y 10/00 369/13.33 |
| 2012/0105996 A1* | 5/2012 | Katine | G11B 5/314 360/59 |
| 2013/0107679 A1* | 5/2013 | Huang | G11B 13/08 369/13.32 |
| 2013/0161505 A1 | 6/2013 | Pitcher | |
| 2013/0164453 A1 | 6/2013 | Pitcher | |
| 2013/0164454 A1 | 6/2013 | Pitcher | |
| 2013/0288077 A1 | 10/2013 | Dhawam | |
| 2014/0004384 A1 | 1/2014 | Zhao | |
| 2014/0113160 A1 | 4/2014 | Pitcher | |
| 2014/0160914 A1* | 6/2014 | Shiono | G11B 7/24065 369/110.01 |
| 2014/0313872 A1 | 10/2014 | Rawat | |
| 2014/0376348 A1 | 12/2014 | Cheng | |
| 2014/0376349 A1 | 12/2014 | Cheng | |
| 2014/0376350 A1* | 12/2014 | Cheng | G11B 5/4866 369/13.33 |
| 2015/0054113 A1* | 2/2015 | Suzuki | H01L 27/14638 257/459 |
| 2015/0069556 A1* | 3/2015 | Yamakawa | H01L 43/02 257/421 |
| 2015/0116090 A1* | 4/2015 | Proehl | H04B 5/0037 340/10.1 |
| 2015/0248905 A1* | 9/2015 | Cheng | G11B 5/4866 369/13.33 |
| 2015/0318003 A1* | 11/2015 | Cheng | G11B 5/313 216/24 |
| 2016/0035379 A1* | 2/2016 | Cheng | G11B 5/4866 369/13.33 |
| 2016/0133277 A1* | 5/2016 | Cheng | G11B 5/314 369/13.33 |

FOREIGN PATENT DOCUMENTS

| | | |
|---|---|---|
| EP | 0942072 | 9/1999 |
| EP | 1328027 | 7/2003 |
| EP | 2106678 | 10/2008 |
| WO | WO 97/45834 | 12/1997 |
| WO | WO 2013/163195 | 10/2013 |
| WO | WO 2013/163470 | 10/2013 |

OTHER PUBLICATIONS

U.S. Appl. No. 14/062,651, filed Oct. 24, 2013, Zou.
U.S. Appl. No. 14/531,455, filed Nov. 3, 2014, Huang.
U.S. Appl. No. 14/535,529, filed Nov. 7, 2014, Huang.
U.S. Appl. No. 14/535,527, filed Nov. 7, 2014, Huang.
Al-Bayati et al., Junction Profiles of Sub keV Ion Implantation for Deep Sub-Quarter Micron Devices, *IEEE*, 2000, pp. 87-90.
Angel et al., "Enhanced Low Energy Drift-Mode Beam Currents in a High Current Ion Implanter," *IEEE*, 1999, pp. 219-222.
Druz et al., "Diamond-Like Carbon Films Deposited Using a Broad, Uniform Ion Beam from an RF Inductively Coupled CH4-Plasma Source", Diamond and Related Materials, vol. 7, No. 7, Jul. 1998, pp. 965-972.
Liu et al., "Influence of the Incident Angle of Energetic Carbon Ions on the Properties of Tetrahedral Amorphous Carbon (ta-C) films", *Journal of Vacuum Science and Technology*, vol. 21, No. 5, Jul. 25, 2003, pp. 1665-1670.
Metallization: "Metallization; chapter 5", In: Kris v. Srikrishnan and Geraldine C. Schwartz: "Handbook of Semiconductor Interconnection Technology, Second Edition", 2006, CRC Press, Boca Raton, FL, USA, XP002711255, ISBN:978-1-4200-1765-6, pp. 311-382, Section 5.4.1.2 Adhesion; p. 320.
Piazza et al., "Large Area Deposition of Hydrogenated Amorphous Carbon Films for Optical Storage Disks", Diamond and Related Materials, vol. 13, No. 4-8, Apr. 2004, pp. 1505-1510.
Robertson, J., "Diamond-Like Amorphous Carbon," *Materials Science and Engineering R 37*, 2002, pp. 129-281.
Satoh et al., "Evaluation of Adhesion Materials for Gold Line-and-Space Surface Plasmon Antenna on SO1-MOS Photodiode", Silicon Nanoelectronics Workshop (SNW), 2010, *IEEE*, Piscataway, NJ, USA, Jun. 13, 2010, pp. 1-2.
Vogt, K.W. et al., "Characterization of Thin Titanium Oxide Adhesion Layers on Gold Resistivity, Morphology, and Composition", *Surface Science*, North-Holland, Amsterdam, NL, vol. 301, No. 1-3, Jan. 10, 1994, pp. 203-213.

\* cited by examiner

DEVICES INCLUDING AN AMORPHOUS GAS BARRIER LAYER

PRIORITY

This application claims priority to U.S. Provisional Application No. 62/078,113 entitled, filed on Nov. 11, 2014, the contents of which are incorporated herein by reference thereto in their entirety.

SUMMARY

Disclosed are devices that include a near field transducer (NFT); an amorphous gas barrier layer positioned on at least a portion of the NFT; and a wear resistance layer positioned on at least a portion of the gas barrier layer.

Also disclosed are devices that include a near field transducer (NFT); an amorphous gas barrier layer positioned on at least a portion of the NFT; a NFT adhesion layer positioned between the NFT and the amorphous gas barrier layer; and a wear resistance layer positioned on at least a portion of the gas barrier layer.

Further disclosed are methods that include forming a near field transducer (NFT); forming an amorphous gas barrier layer on the NFT by depositing a metal layer and subsequently oxidizing at least part of the metal layer, the metal layer comprising: tantalum (Ta), titanium (Ti), chromium (Cr), zirconium (Zr), yttrium (Y), magnesium (Mg), niobium (Nb), hafnium (Hf), aluminum (Al), and combinations thereof; and forming a wear resistance layer on the gas barrier layer.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Heat assisted magnetic recording (referred to through as HAMR) utilizes radiation, for example from a laser, to heat media to a temperature above its curie temperature, enabling magnetic recording. In order to deliver the radiation, e.g., a laser beam, to a small area (on the order of 20 to 50 nm for example) of the medium, a NFT is utilized. During a magnetic recording operation, the NFT absorbs energy from a laser and focuses it to a very small area; this can cause the temperature of the NFT to increase. The temperature of the NFT can be elevated up to about 400° C. or more.

The high temperatures that the NFT and surrounding structures reach during operation can lead to oxidation, corrosion, or both of the write pole. In addition, the high temperatures can cause adhesion layers over the peg to oxidize, which can lead to the peg separated from surrounding structures, including the overcoat layer disposed thereon. Ultimately, these processes can lead to peg deformation and recession, pole oxidation, pole protrusion, and damage of the overcoat layer for example. All of these effects can also reduce the magnetic field delivered to the media thereby affecting writing to the media.

Disclosed devices include one or more gas barrier layers adjacent to a wear resistant layer over at least a peg region of a NFT of a magnetic head. The gas barrier layer may function to improve gas barrier properties of the overall structure over the head. The gas barrier layer can be considered part of an overcoat structure or can be considered a separate layer or structure that functions cooperatively with the overcoat structure.

Figure 1:
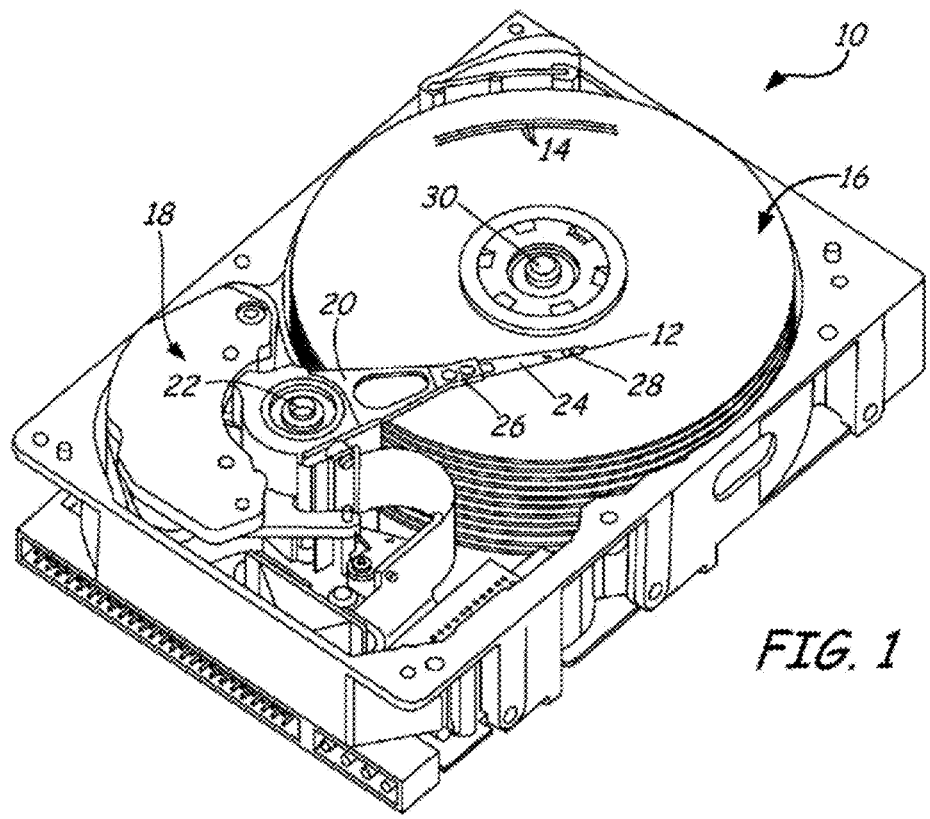
FIG. 1 is a perspective view of a magnetic disc drive that can include HAMR devices.

FIG. 1 is a perspective view of disc drive 10 including an actuation system for positioning slider 12 over track 14 of magnetic medium 16. The particular configuration of disc drive 10 is shown for ease of description and is not intended to limit the scope of the present disclosure in any way. Disc drive 10 includes voice coil motor 18 arranged to rotate actuator arm 20 on a spindle around axis 22. Load beam 24 is connected to actuator arm 20 at head mounting block 26. Suspension 28 is connected to an end of load beam 24 and slider 12 is attached to suspension 28. Magnetic medium 16 rotates around an axis 30, so that the windage is encountered by slider 12 to keep it aloft a small distance above the surface of magnetic medium 16. Each track 14 of magnetic medium 16 is formatted with an array of data storage cells for storing data. Slider 12 carries a magnetic device or transducer (not shown in FIG. 1) for reading and/or writing data on tracks 14 of magnetic medium 16. The magnetic transducer utilizes additional electromagnetic energy to heat the surface of medium 16 to facilitate recording by a process termed heat assisted magnetic recording (HAMR).

Figure 2:
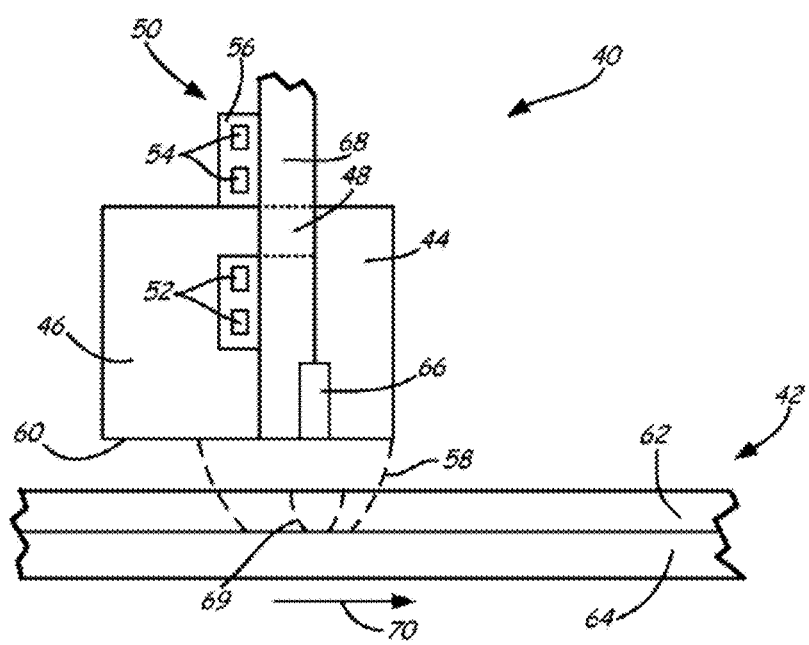
FIG. 2 is a cross sectional view of a perpendicular HAMR magnetic recording head and of an associated recording medium.

A HAMR transducer includes a magnetic writer for generating a magnetic field to write to a magnetic medium (e.g. magnetic medium 16) and an optical device to heat a portion of the magnetic medium proximate to the write field. FIG. 2 is a cross sectional view of a portion of a magnetic device, for example a HAMR magnetic device 40 and a portion of associated magnetic storage medium 42. HAMR magnetic device 40 includes write pole 44 and return pole 46 coupled by pedestal 48. Coil 50 comprising conductors 52 and 54 encircles the pedestal and is supported by an insulator 56. As shown, magnetic storage medium 42 is a perpendicular magnetic medium comprising magnetically hard storage layer 62 and soft magnetic underlayer 64 but can be other forms of media, such as patterned media. A current in the coil induces a magnetic field in the pedestal and the poles. Magnetic flux 58 exits the recording head at air bearing surface (ABS) 60 and is used to change the magnetization of portions of magnetically hard layer 62 of storage medium 42 enclosed within region 58. Near field transducer 66 is positioned adjacent the write pole 44 proximate air bearing surface 60. Near field transducer 66 is coupled to waveguide 68 that receives an electromagnetic wave from an energy source such as a laser. An electric field at the end of near field transducer 66 is used to heat a portion 69 of magnetically hard layer 62 to lower the coercivity so that the magnetic field from the write pole can affect the magnetization of the storage medium. As can be seen in FIG. 2, a portion of the near field transducer is positioned at the ABS 60 of the device.

Devices disclosed herein can also include other structures. Devices disclosed herein can be incorporated into larger devices. For example, sliders can include devices as disclosed herein. Exemplary sliders can include a slider body that has a leading edge, a trailing edge, and an air bearing surface. The write pole, read pole, optical near field transducer and contact pad (and optional heat sink) can then be located on (or in) the slider body. Such exemplary sliders can be attached to a suspension which can be incorporated into a disc drive for example. It should also be noted that disclosed devices can be utilized in systems other than disc drives such as that depicted in FIG. 1.

Figure 3A:
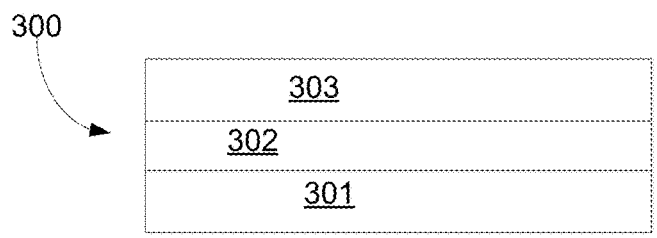
FIGS. 3A, 3B, and 3C are cross sectional views of devices that include disclosed gas barrier layers.

FIG. 3A illustrates a cross section of an illustrative device 300. The device 300 includes a substrate 301, an amorphous gas barrier layer 302 and a wear resistance layer 303. The amorphous gas barrier layer 302 is positioned between the substrate 301 and the wear resistance layer 303. The substrate 301 can include or be a NFT or a portion thereof. In some embodiments, the substrate 301 can include a portion of a NFT at the ABS of a larger structure or device. It should be noted that the amorphous gas barrier layer 302 and the wear resistance layer 303 can cover more than just a NFT or a portion of a NFT.

It should also be noted that amorphous gas barrier layers described herein can be utilized on magnetic recording media to improve the gas barrier properties thereof as well or in place of utilizing an amorphous gas barrier layer on the head. Details discussed herein regarding amorphous gas barrier layers apply to those that may be utilized on magnetic recording media as well.

In some embodiments, a NFT can be made of a plasmonic material. Illustrative NFT materials can include plasmonic materials such as gold (Au), silver (Ag), aluminum (Al), copper (Cu), ruthenium (Ru), rhodium (Rh), iridium (Ir), or alloys thereof; titanium nitride (TiN), zirconium nitride (ZrN), or combinations thereof; thermally conductive oxides; indium tin oxide (ITO); and combinations thereof. In NFTs made of materials having relatively low oxidation resistance (e.g., Rh, TiN, ZrN, etc.), oxidation of the NFT may lead to loss of functionality of the NFT. In some embodiments, illustrative NFT materials can also include those disclosed in U.S. Patent Publication No. 2013/0286799, U.S. Pat. No. 8,427,925, and U.S. patent application Ser. No. 13/923,925 entitled MAGNETIC DEVICES INCLUDING FILM STRUCTURES, filed on Jun. 21, 2013, and Ser. No. 14/062,651 entitled RECORDING HEADS INCLUDING NFT AND HEATSINK, filed on Oct. 24, 2013, the disclosures of which are incorporated herein by reference thereto.

In some embodiments a wear resistance layer can function to protect the underlying structures and provide wear resistance to the material making up the underlying structure (or structures). Wear resistant layers can have various thicknesses. In some embodiments, wear resistant layers can have thicknesses of not less than 0.2 nanometers (nm), or in some embodiments not less than 0.5 nm. In some embodiments, wear resistant layers can have thickness of not greater than 20 nm, or in some embodiments not greater than 5 nm.

Illustrative types of materials that can be utilized in disclosed wear resistance layers can include, for example carbon containing materials, magnetic materials, molecular materials, and oxides such as tantalum oxide.

In some embodiments, the wear resistant layer can include a carbon containing material. Illustrative carbon containing materials includes, for example diamond like carbon (DLC), amorphous carbon, carbon nitride, metal containing amorphous carbon, tetrahedral amorphous carbon, hydrogen containing amorphous carbon (a-C:H), or combination thereof.

In some embodiments, the wear resistant layer can include magnetic materials. One class of magnetic materials that can be utilized in wear resistance layers can includes mixtures of ferromagnetic materials and insulating materials. There are two subclasses of such materials mixtures of ferromagnetic materials and oxides and mixtures of ferromagnetic materials and de-coupled grains. Specific types of mixtures of ferromagnetic materials and oxides can include, for example, cobalt (Co) doped titanium oxide (TiO), and iron cobalt (FeCo) doped yttrium oxide ($Y_2O_3$). Specific types of mixtures of ferromagnetic materials and de-coupled grains can include, for example, cobalt platinum (CoPt) doped carbon (C), silicon dioxide ($SiO_2$), and alumina ($Al_2O_3$).

Another class of magnetic materials that can be utilized as wear resistant layers can include semiconductors doped with magnetic materials. Specific types of such materials can include, for example, cobalt (Co), nickel (Ni), iron (Fe), or chromium (Cr) doped titanium oxide ($TiO_x$); Co or manganese (Mn) doped zinc oxide (ZnO); Fe or Mn doped tin oxide ($SnO_x$); Fe or Mn doped indium oxide ($In_2O_3$), chromium oxide ($CrO_2$), or europium oxide (EuO); and magnetic nitrides such as chromium aluminum nitride (CrAlN), gallium chromium nitride (GaCrN), gallium vanadium nitride (GaVN), and indium vanadium nitride (InVN). In some embodiments, materials of this class that could be used could have relatively high coercivity in order to be magnetically hard.

Another class of magnetic materials that can be utilized as wear resistant layers can include ferrites. Specific types of such materials can include, for example, barium ferrites ($BaFe_xO_y$) such as $BaFe_{12}O_{19}$, strontium ferrites ($SrFe_xO_y$), and cobalt ferrites ($CoFe_xO_y$). In some embodiments, strontium ferrites ($SrFe_xO_y$) can be utilized in overcoats as disclosed herein.

Another class of magnetic materials that can be utilized as wear resistant layers can include two phase materials. Two phase materials can include, for example, ferromagnet/insulator materials or paramagnet/insulator materials. Specific types of such materials can include, for example, cobalt (Co), iron (Fe), nickel (Ni) or their alloys dispersed in an alumina ($Al_2O_3$), silica ($SiO_2$), or carbon (C) matrix.

Another class of magnetic materials that can be utilized as wear resistant layers can include atomic level bilayers or multilayers. The bilayers or multilayers can include both ferromagnet material/insulator material and paramagnet material/insulator material. Specific types of such materials can include, for example, atomic level bilayers or multilayers of cobalt (Co), iron (Fe), or nickel (Ni) with alumina ($Al_2O_3$), silica ($SiO_2$) or carbon (C). Graded layers can also be utilized as wear resistant layers. Specific types of such materials can include, for example, graded layers of cobalt (Co), iron (Fe), or nickel (Ni) with alumina ($Al_2O_3$), silica ($SiO_2$) or carbon (C).

Partially oxidized ferromagnetic or ferrimagnetic materials are magnetic materials that can also be utilized in wear resistant layers. Specific types of such materials can include, for example, FeCoO, and $Fe_xO_y$. In some embodiments, materials of this class that could that would be used would have relatively high Curie temperature (Tc) in order to be magnetically hard.

Another class of magnetic materials that can be utilized as overcoats includes exotic materials. Specific types of such materials can include, for example, manganese (Mn) doped indium antimony (InSb), and cobalt (Co) doped titanium antimony (TiSb). In some embodiments, materials of this class that could that would be used would have relatively high Curie temperature (Tc), for example at least about 400° C.

Wear resistant layers including magnetic materials can also be formed by deposition of a metal layer (via chemical vapor deposition or atomic layer deposition for example) followed by oxidation in order to produce a ferromagnetic/ferrimagnetic oxide. Types of oxidation that can be utilized herein can include, for example, natural oxidation, radical shower oxidation, ultraviolet (UV) light assisted oxidation, ion beam oxidation, or oxygen plasma oxidation. In some embodiments where an atomic layer deposition process is utilized, a stoichiometric oxide can be formed using a precursor, which can provide a metal cation, and another precursor, which provides an oxygen anion. Specific materials that can be utilized herein can include, for example, $BaFe_{12}O_{19}$, $CrO_2$, $\gamma$-$Fe_2O_3$, $CoFe_2O_4$ and $Fe_3O_4$. Multilayers or composites including such materials can be utilized. In addition, Fe, Co or Ni may be added to the multilayers or composites in order to affect the magnetic properties of the overcoat material. Ferromagnetic epitaxial growth layers may also be used to obtain a desired oxide phase, while still maintaining magnetic exchange to the underlying head or media layer. A carbon layer may also be modified to make it more magnetically permeable by the addition of Fe, Co, Ni, or a combination thereof for example.

In some embodiments, wear resistant layers can also include molecular materials. Molecular materials include molecules as opposed to atoms (i.e., carbon atoms as in diamond like carbon (DLC)). Molecules are most generally described as electrically neutral groups of atoms that are held together by covalent bonds. In some embodiments, disclosed molecular wear resistant layers can include carbon-nitrogen bonds. In some embodiments, disclosed molecular wear resistant layers can include polymers that include carbon-nitrogen bonds. Illustrative polymers can include, polyimides, polyamides, polyamideimides, polybenzimidazoles, polyetherimides, polyurethanes, polyetherketones, polyetheretherketones, and polytestrafluorethylenes, for example. In some embodiments, polyamides or polyimides can be utilized in molecular wear resistant layers. Polyimides, as a group, are known to have excellent thermal stability, i.e., greater than 400° C. Polyimides can be utilized in wear resistant layers in three different ways, by depositing the polymer, by depositing an intermediate of a polyimide, or by depositing starting materials of a polyimide or an intermediate. One method of forming a polyimide is the reaction of a dianhydride and a diamine. Illustrative dianhdrides that have desirable vapor pressures can include, for example pyromellitic dianhydride, cyclobutane-tetracarboxylic dianhydride, cyclopentane-tetracarboxylic dianhydride, bis(dicarboxyphenyl)hexafluoropropane dianhydride, ethylene tetracarboxylic dianhydride, trimellitic anhydride, tetrafluorophthalic anhydride, and phthalic anhydride. Ethylene tetracarboxylic dianhydride may have drawbacks in manufacturing processes because of its relative instability. Compounds like trimellitic anhydride, tetrafluorophthalic anhydride and phthalic anhydride may be useful in situations where the polymer is desired to be limited to a trimer. Illustrative diamines that have desirable vapor pressures can include, for example ortho-, meta-, or para-phenylene diamine, ortho-, meta-, or para-xylene diamine, oxydiphenylene diamine, aminobenzylamines, bis(trifluoromethyl)biphenyldiamine, tetrafluoro phenylene diamine, and bis(aminomethyl)-cyclohexanes. A particularly illustrative polyimide is KAPTON® from DuPont.

In some embodiments, wear resistant layers can also include oxides, such as tantalum oxide for example. The formula of tantalum oxide or tantalum oxides can be given as $Ta_yO_x$ with x and y being a number (integer or otherwise). In some embodiments, y can range from 1 or 2; and x can be range from 2 to 5. In some embodiments, y can be 1 or 2; and x can be an integer from 2 to 5. Tantalum oxide exists in various forms, depending on the oxidation state of the tantalum. Tantalum oxide can be described as being tantalum rich (x is higher than y, i.e., fractionally higher) or oxygen rich (y is higher than x, i.e., fractionally higher). Tantalum oxide can also exist as $Ta_2O_5$, $TaO_2$, $Ta_2O_3$, or combinations thereof. The phrase "tantalum oxide", when used herein can refer to a single form of tantalum oxide or multiple forms of tantalum oxide. $Ta_2O_5$ can be referred to as tantalum pentoxide, tantalum (V) oxide, or ditantalum pentoxide. $TaO_2$ can be referred to as tantalum dioxide, or tantalum (IV) oxide. $Ta_2O_3$ can be referred to as ditantalum trioxide, or a suboxide of tantalum. Disclosed wear resistant layers can also include tantalum in addition to one or more forms of tantalum oxide.

Disclosed devices also include amorphous gas barrier layers. Amorphous gas barrier layers can function to diminish the amount or entirely prevent gases from reaching or contacting layers or structures located below the amorphous gas barrier layer. In some embodiments, an amorphous gas barrier layer can function to diminish the amount or entirely prevent gases from reaching the write pole, the heat skin, the magnetic reader, the NFT (e.g., the peg, disc, or both), or any combination thereof. In some embodiments, an amorphous gas barrier layer can function to diminish the amount or entirely prevent gases from reaching the write pole, the NFT (e.g., the peg, disc or both), or any combination thereof. In some embodiments, an amorphous gas barrier layer can function to diminish the amount or entirely prevent gases from reaching the write pole and the peg of the NFT.

Amorphous materials can be useful as gas barrier layers because they do not include grain boundaries, as crystalline layers do. A crystalline material will have boundaries between the multiple crystals that make up a layer. Each of these boundaries, or defects that exist at the boundaries, afford an access pathway or diffusion tunnel for materials (e.g., reactive gases, water vapor, and other corrosive ions) to travel into and through the gas barrier layer.

An amorphous material is one that is not crystalline in nature and does not have a long range ordered lattice structure. In some embodiments, an amorphous material can be described as having a smaller grain size than that of a crystalline layer. In some embodiments, an amorphous material is one in which the average grain size is not greater than 5 nm, or in some embodiments not greater than 3 nm. In some embodiments, the average grain size of a material could be measured using high resolution transmission electron microscopy (TEM), for example.

The growth of thin films at low temperatures is a non-equilibrium process. For the deposition of metallic, oxide or nitride films, usually a thin amorphous layer is initially formed on the substrate surface. With increasing film thickness, the film structure changes gradually from amorphous to columnar crystalline. Therefore, maintaining relatively thin films will more likely maintain the amorphous structure. It has also been found that amorphous films with smaller thickness show much higher thermal stability and toughness.

Amorphous gas barrier layers can have various thicknesses. In some embodiments, gas barrier layers can have thicknesses of not less than 0.1 nm, in some embodiments not less than 0.5 nm, or in some embodiments not less than 1 nm. In some embodiments, gas barrier layers can have thickness of not greater than 10 nm, in some embodiments not greater than 5 nm, or in some embodiments not greater than 1.5 nm. Amorphous gas barrier layers are typically relatively thin, or are deposited in multiple steps of thin layers because as a layer becomes thicker, it is more likely to become crystalline instead of amorphous.

In some embodiments, amorphous gas barrier layers can include materials that have relatively high thermal stability, relatively low optical absorption, a refractive index that is not greater than 3.5 or in some embodiments not greater than 2, or substantially matches (e.g., within 30%) the NFT and/or the wear resistance layer, or any combination thereof.

In some embodiments, amorphous gas barrier layers can include oxides, nitrides, or combinations thereof. In some embodiments, amorphous gas barrier layers can include oxides such as tantalum oxide (TaO), chromium oxide (CrO), titanium oxide (TiO), zirconium oxide (ZrO), yttrium oxide (YO), niobioum oxide (NbO), hafnium oxide (HfO), aluminum oxide (AlO), magnesium oxide (MgO), iron oxide (FeO), cobalt oxide (CoO), nickel oxide (NiO), or some combination thereof. Illustrative combinations of such oxides can include, for example chromium aluminum oxide (CrAlO). Furthermore, the specific ternary oxide, indium tin oxide (InSnO, which is typically referred to as "ITO") can also be utilized in amorphous gas barrier layers. In some embodiments, amorphous gas barrier layers can include magnesium oxide (MgO), iron oxide (FeO), cobalt oxide (CoO), nickel oxide (NiO), ITO, or some combination thereof. In some embodiments, amorphous gas barrier layers can include titanium oxide (TiO), yttrium oxide (YO), chromium oxide (CrO), or combinations thereof for example. In some embodiments, amorphous gas barrier layers can include yttrium oxide (YO), for example. It should be noted that oxides can include any stoichiometry including the particular noted element and oxygen.

In some embodiments, gas barrier layers can include nitrides such as titanium nitride (TiN), zirconium nitride (ZrN), niobioum nitride (NbN), hafnium nitride (HfN), chromium nitride (CrN), or combinations thereof. Illustrative combinations of nitrides can include, for example titanium niobium nitride (TiNbN) for example. In some embodiments, mixtures of oxides and nitrides (for example) can be utilized. Illustrative examples of such materials include aluminum oxy nitride (AlON), titanium oxy nitride (TiON), zirconium oxy nitride (ZrON), chromium oxy nitride (CrON), niobioum oxy nitride (NbON), hafnium oxy nitride (HfON), tantalum oxy nitride (TaON), yttrium oxy nitride (YON), or combinations thereof, for example.

In some embodiments, amorphous gas barrier layers can include network forming elements. Network forming elements typically form strong bonds to each other and other elements. As such, the inclusion of network forming elements can increase the thermal stability of the amorphous gas barrier layer. The elements that form the amorphous film are confined in a three-dimensional random network of strong bonds, which prevents the diffusion of the elements and improves its thermal stability. Among various oxides, $SiO_2$, $GeO_2$, $B_2O_3$, and $P_2O_5$ are known to be good network formers which can develop the three-dimensional random network and can form a glass by themselves. In some embodiments, the amorphous gas barrier layer is a composite film including at least one of the network forming elements, such as Si, Ge, B, P, Al, Cr. In some embodiments, the concentration of the network forming elements can be not less than 5 atomic % (at %), in some embodiments, not less than 10 at %, or in some embodiments, not less than 20 at % for example. In some embodiments, the concentration of the network forming elements can be not greater than 90 at %, or in some embodiments, not greater than 80 at %, for example. The other component(s) in such amorphous gas barrier layers are those discussed above.

Such composite amorphous gas barrier layers could be deposited from a composite target, or co-deposited from two (or more) targets, for example. The composite film could be also be deposited by ion implantation. In another embodiment, the composite film can be deposited by depositing multiple alternate layers. During the deposition, a negative substrate bias can be applied to cause the intermixing of the layers to form such composite amorphous gas barrier layers. The substrate bias could be DC, pulsed DC, AC, or RF for example. The voltage of the substrate bias can be in the range of −10 V to 100 kV, or in some embodiments in the range of −100V to −60 kV.

Figure 5:
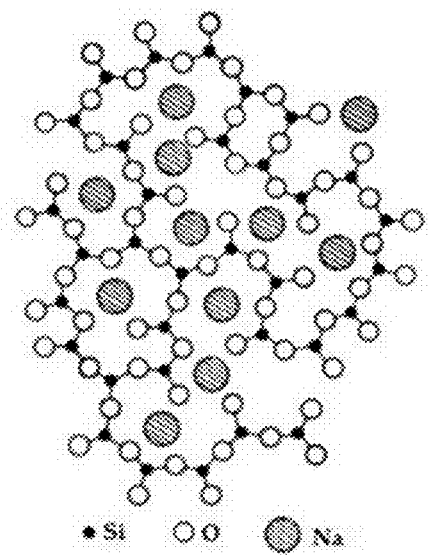
FIG. 5 is a schematic two-dimensional illustration of the structure of a binary sodium silicate glass as an illustrative example of how a network forming element (Me) affects an oxide, for example.

Network modifiers can also be added to the amorphous gas barrier layer to improve its thermal stability. These components do not form networks but occupy thermodynamically stable sites as illustrated schematically in FIG. 5, or act as a replacement for a part of network.

The thermal stability of the amorphous gas barrier layer can also be improved by adding a secondary component, such as heavy metal oxides, alkalis, or halogens to increase its thermal stability. In some embodiment, metals or oxides having significantly different crystalline structures, bonding lengths, bonding strengths, atomic radii, or combinations thereof can be added to the amorphous gas barrier layer to keep it from crystallizing and improve its thermal stability.

In some embodiments, amorphous gas barrier layers including oxides can be made by depositing a metal layer and then oxidizing the metal layer. Illustrative metals can include tantalum (Ta), titanium (Ti), chromium (Cr), zirconium (Zr), yttrium (Y), magnesium (Mg), niobium (Nb), hafnium (Hf), aluminum (Al), and combinations thereof for example. Oxidation of the metal layer can be accomplished using various processes, including thermal oxidation, and plasma oxidation processes, for example. The oxidation process effectively adds oxygen atoms into the metallic layer, which can cause expansion of the metal lattice. Expansion of the metal lattice can reduce the defect density of the metal layer (e.g., vacancies, grain boundaries, dislocations, and pin holes) or an amorphous gas barrier layer formed thereby. Such effects could serve to increase corrosion resistance of the overall device. In some embodiments, the metal film can be deposited in an argon (Ar) atmosphere and then oxidized to form a fully oxidized amorphous film. The oxidation process could be air oxidation, air isothermal oxidation, plasma oxidation, remote plasma oxidation, or ozone oxidation, for example.

In some embodiments, amorphous gas barrier layers including oxides can also be formed using any physical vapor deposition or chemical vapor deposition process including for example magnetron sputtering, ion beam assisted deposition (IBD), laser ablation, filtered cathodic arc, evaporation, ionized magnetron sputtering, chemical vapor deposition, plasma enhanced chemical vapor deposition (PECVD), radio frequency (rf) PECVD, microwave PECVD, atomic layer deposition (ALD), and plasma assisted ALD, for example. In some embodiments, amorphous gas barrier layers can be formed by sputtering (for example) from an oxide target in an oxygen rich environment. In some embodiments, amorphous gas barrier layers can be formed by sputtering a metal and subsequently oxidizing or at least partially oxidizing the deposited metal.

Figure 3B:
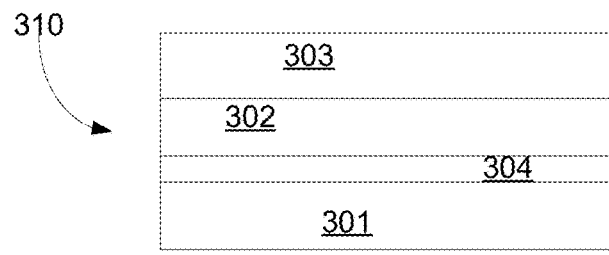

FIG. 3B depicts another illustrative device 310 that includes a substrate 301, an amorphous gas barrier layer 302 and a wear resistant layer 303, configured as described in FIG. 3A. The device 310 also includes an optional substrate adhesion layer 304. The optional substrate adhesion layer 304 can be positioned between the substrate 301 and the amorphous gas barrier layer 302. The optional substrate adhesion layer 304 can function to improve the adhesion between the amorphous gas barrier layer 302 and the substrate 301. Properties of the substrate adhesion layer 304 can depend, at least in part, on the materials of the overlying amorphous gas barrier layer 302 and the underlying substrate 301.

In some embodiments, the substrate 301 can include the NFT peg and the substrate adhesion layer can be utilized to enhance the adhesion of the amorphous gas barrier layer 302 to the substrate 301 (e.g., the peg). In such embodiments, the optional substrate adhesion layer 304 can include a metal. Illustrative metals can include, for example chromium (Cr), titanium (Ti), tantalum (Ta), yttrium (Y), niobium (Nb), ruthenium (Ru), iridium (Ir), silicon (Si), nickel (Ni), zirconium (Zr), or combinations thereof.

Figure 3C:
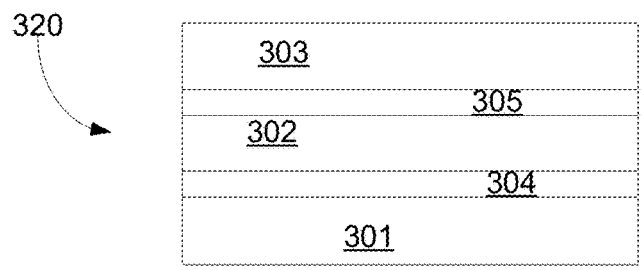

FIG. 3C depicts another illustrative device 320 that includes a substrate 301, an amorphous gas barrier layer 302 and a wear resistant layer 303, configured as described in FIGS. 3A and 3B. The device 320 may also include an optional substrate adhesion layer 304. The device 320 may also include an optional wear resistant adhesion layer 305. It should be noted that the optional wear resistant adhesion layer 305 can be included in a device without the optional substrate adhesion layer 304, even though that particular configuration is not specifically depicted herein. The optional wear resistant adhesion layer 305 can be positioned between the wear resistant layer 303 and the amorphous gas barrier layer 302. The optional wear resistant adhesion layer 305 can function to improve the adhesion between the amorphous gas barrier layer 302 and the wear resistant layer 305. Properties of the wear resistant adhesion layer 305 can depend, at least in part, on the materials of the underlying amorphous gas barrier layer 302 and the overlying wear resistant layer 303.

Optional adhesion layers (e.g., substrate adhesion layers, wear resistant adhesion layers, or both) can have various thicknesses. In some embodiments, optional adhesion layers can have thicknesses of not less than 0.1 nm, or in some embodiments not less than 0.5 nm. In some embodiments, optional adhesion layers can have thickness of not greater than 5 nm, in some embodiments not greater than 3 nm, or in some embodiments not greater than 2 nm. In some embodiments, it can be advantageous that the optional adhesion layers are relatively thin so that the optical absorption is reduced.

In some embodiments, optional substrate adhesion layers can include metals for example. In some embodiments, optional substrate adhesion layers can include metals such as platinum (Pt), chromium (Cr), tantalum (Ta), iridium (Ir), rhodium (Rh), ruthenium (Ru), niobium (Nb), nickel (Ni), rhenium (Re), titanium (Ti), lead (Pb), zirconium (Zr), or combinations thereof. In some embodiments, optional substrate adhesion layers can include metals such as rhenium (Re), titanium (Ti), lead (Pb), zirconium (Zr), or combinations thereof.

In some embodiments, optional wear resistant adhesion layers can include nitrides, oxides, carbides, silicides, borides, metals, or combinations thereof. In some embodiments, optional wear resistant adhesion layers can includes oxides such as tantalum oxide (TaO), aluminum oxide (AlO), silicon oxide (SiO), chromium oxide (CrO), niobium oxide (NbO), titanium oxide (TiO), hafnium oxide (HfO), or combinations thereof. In some embodiments, optional wear resistant adhesion layers can includes oxides such as silicon oxide (SiO), chromium oxide (CrO), niobium oxide (NbO), titanium oxide (TiO), hafnium oxide (HfO), or combinations thereof. It should be noted that oxides can include any stoichiometry including the particular noted element and oxygen. In some embodiments, optional wear resistant adhesion layers can include nitrides such as titanium nitride (TiN), zirconium nitride (ZrN), chromium nitride (CrN), silicon nitride (SiN), aluminum nitride (AlN), tantalum nitride (TaN), niobium nitride (NbN), hafnium nitride (HfN), boron nitride (BN), or combinations thereof. In some embodiments, optional wear resistant adhesion layers can include nitrides such as tantalum nitride (TaN), niobium nitride (NbN), hafnium nitride (HfN), or combinations thereof. In some embodiments, optional wear resistant adhesion layers can include carbides such as titanium carbide (TiC), zirconium carbide (ZrC), chromium carbide (CrC), silicon carbide (SiC), boron carbide (BC), or combinations thereof. In some embodiments, mixtures of oxides and nitrides or nitrides and carbides (for example) can be utilized. Illustrative examples of such materials include silicon oxy nitride (SiON), chromium oxy nitride (CrON), titanium oxy nitride (TiON), aluminum oxy nitride (AlON), tantalum oxy nitride (TaON), tantalum silicon oxy nitride (TaSiON), titanium silicon oxy nitride (TiSiON), silicon aluminum oxy nitride (SiAlON), titanium silicon oxy nitride (TiSiON), titanium aluminum oxy nitride (TiAlON), chromium aluminum oxy nitride (CrAlON), chromium silicon oxy nitride (CrSiON), yttrium oxide nitride (YON), zirconium oxide nitride (ZrON), boron carbon nitride (BCN), or combinations thereof for example. In some embodiments, optional wear resistant adhesion layers can include silicides such as titanium silicide (TiSi), for example. In some embodiments, optional wear resistant adhesion layers can include borides such as titanium boride (TiB), or carbon boride (CB) for example. In some embodiments, optional wear resistant adhesion layers can include metals such as silicon (Si), chromium (Cr), titanium (Ti), zirconium (Zr), or hafnium (Hf) for example. In some embodiments, optional wear resistant adhesion layers can include DLC, DLC having a different structure than a DLC in the wear resistant layer (in embodiments where the wear resistant layer is DLC), or DLC containing Si, N, B, or other metallic elements for example.

Optional adhesion layers can have a substantially homogeneous composition or can have a composition that changes from one major surface (e.g., the surface in contact with a gas barrier layer in a wear resistant adhesion layer) to the opposing major surface (e.g., the surface in contact with the wear resistant layer in a wear resistant adhesion layer). For example, an optional adhesion layer can have a compositional gradient from one major surface to the other major surface. In some embodiments, an optional adhesion layer can have a compositional gradient that can change from the major component being a material that is compatible with (or is even the same as) the gas barrier layer (for example the surface in contact with a gas barrier layer) to the major component being a material that is compatible with (or is even the same as) the wear resistant layer (for example the surface in contact with the wear resistant layer). In some embodiments, an optional adhesion layer can have a compositional gradient such that the material from the gas barrier layer increases in concentration across the adhesion layer from the interface with the wear resistance layer to the interface with the gas barrier layer.

Figure 4A:
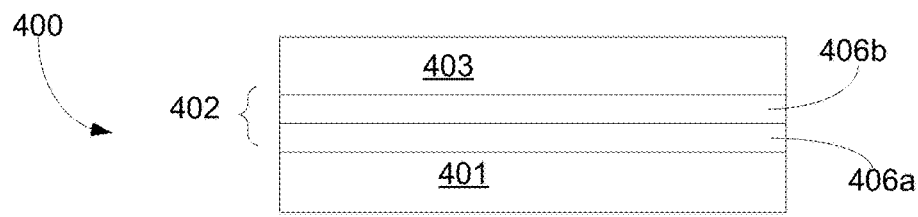
FIGS. 4A and 4B are cross sectional views of devices that include disclosed bilayer gas barrier layers.

FIG. 4A depicts a cross section of a portion of a device 400 that includes an amorphous gas barrier layer 402 positioned between a substrate 401 and a wear resistant layer 403. It should be noted that optional adhesion layers (e.g., a substrate adhesion layer, a wear resistant adhesion layer, or both) can also be included in the device 400, even though not depicted in this figure. The amorphous gas barrier layer 402 includes a first amorphous gas barrier layer 406a and a second amorphous gas barrier layer 406b. The first amorphous gas barrier bilayer 406a may be of the same or a different material than that of the second amorphous gas barrier bilayer 406b. In some embodiments, the first amorphous gas barrier bilayer 406a can be of a first material and the second amorphous gas barrier bilayer 406b may also be of the first material. In some embodiments, the first amorphous gas barrier bilayer 406a can be of a first material and the second amorphous gas barrier bilayer 406b may be of a second material. The first amorphous gas barrier bilayer 406a and the second amorphous gas barrier bilayer 406b may also include the same components, but at different amounts.

In some embodiments, the second amorphous gas barrier layer 406b may be a material that has a relatively high thermal stability. In some embodiments, the second amorphous gas barrier layer 406b can include silicon oxide (SiO), germanium oxide (GeO), aluminum oxide (AlO), chromium oxide (CrO), boron oxide (BO), boron nitride (BN), silicon nitride (SiN), aluminum nitride (AlN), germanium nitride (GeN), silicon oxy nitride (SiON), aluminum oxy nitride (AlON), chromium oxy nitride (CrON), germanium oxy nitride (GeON), boron oxy nitride (BON), tantalum oxy nitride (TaON), tantalum silicon oxy nitride (TaSiON), or combinations thereof for example.

The first amorphous gas barrier bilayer 406a and the second amorphous gas barrier bilayer 406b need not, but may have substantially the same thickness. In some embodiments, the first gas barrier bilayer 406a may have thicknesses of not less than 0.1 nm, in some embodiments not less than 0.5 nm, or in some embodiments not less than 1 nm. In some embodiments, the first amorphous gas barrier layers can have thickness of not greater than 10 nm, in some embodiments not greater than 5 nm, or in some embodiments not greater than 1.5 nm. In some embodiments, the second amorphous gas barrier layer 406b may have thicknesses of not less than 0.1 nm, in some embodiments not less than 0.5 nm, or in some embodiments not less than 1 nm. In some embodiments, gas barrier layers can have thickness of not greater than 10 nm, in some embodiments not greater than 5 nm, or in some embodiments not greater than 1.5 nm. It should also be noted that one or both of the optional adhesion layers (e.g., wear resistant adhesion layer and substrate adhesion layer) can be utilized in combination with an amorphous gas barrier layer that includes both first and second amorphous gas barrier layers, even though it is not depicted herein.

Figure 4B:
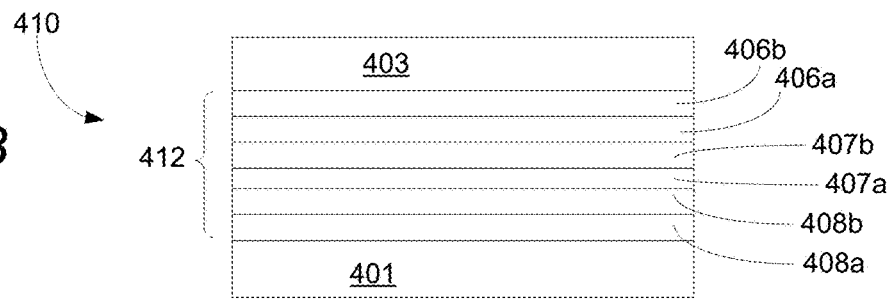

FIG. 4B depicts a cross section of a portion of a device 410 that includes an amorphous gas barrier layer 412 positioned between a substrate 401 and a wear resistant layer 403. It should be noted that optional adhesion layers (e.g., a substrate adhesion layer, a wear resistant adhesion layer, or both) can also be included in the device 410, even though not depicted in this figure. The amorphous gas barrier layer 412 includes a plurality of individual bilayers. The particular embodiment depicted includes three sets of bilayers, a first amorphous gas barrier bilayer 406a and a second amorphous gas barrier bilayer 406b, a first amorphous gas barrier bilayer 407a and a second amorphous gas barrier bilayer 407b, and a first amorphous gas barrier bilayer 408a and a second amorphous gas barrier bilayer 408b. Disclosed devices can include any number of sets of bilayers, where a set of bilayers includes two individual bilayers. In some embodiments, disclosed devices can include at least two sets of bilayers, at least three sets of bilayers, at least 8 sets of bilayers, and in some embodiments ten (10) sets of bilayers. In some embodiments, disclosed devices can include not more than 100 sets of bilayers for example. Interlayers can be added between the amorphous gas barrier bilayers, between sets of the bilayers, between the amorphous gas barrier bilayers and the substrate, between the amorphous gas barrier bilayers and the wear resistant layers, or any combination thereof.

In some embodiments, a single set of bilayers can include a first bilayer having a first set of properties and a second bilayer having a second set of properties. In some embodiments, a first bilayer can differ from a second bilayer in one or more than one property (e.g., material, compositional gradient, thickness, refractive index, optical absorption, internal stress, density, grain size, crystalline structure, lattice constant, physical properties, chemical properties, or corrosion resistance). In some embodiments each set of bilayers can be positioned in the same way, for example, within each set of bilayers, a first bilayer is positioned closer to the substrate than the second bilayer. The configuration of the sets of bilayers can be described as alternating. Bilayers that make up a gas barrier layer can be made of materials similar to those discussed above.

Individual bilayers can have substantially the same thicknesses or different thicknesses. Individual bilayers can have various thicknesses. In some embodiments, individual bilayers can be at least 0.1 nm thick, and in some embodiments individual bilayers can be at least 0.5 nm thick. In some embodiments, individual bilayers can be not greater than 10 nm thick, and in some embodiments individual bilayers can be at least 5 nm.

In some embodiments, amorphous gas barrier layers that include bilayers can be made using a process that includes a delay between depositions. A delay between the depositions (whether the materials are made of the same material or different) could further minimize or even prevent the formation of pin holes that traverse the entire span of the gas barrier layer. Incorporation of a time delay during plasma deposition (for example) may function to facilitate renucleation of the material of the just deposited bilayer before the next layer is deposited thereon. In some embodiments, a time delay of at least 0.1 seconds can be utilized between deposition steps. In some embodiments, a time delay of not greater than 30 minutes can be utilized between deposition steps.

While the present disclosure is not so limited, an appreciation of various aspects of the disclosure will be gained through a discussion of the examples provided below.

EXAMPLES

In this example, yttrium oxide (YO) was as the amorphous gas barrier layer. YO is in direct contact with the ABS surface of the HAMR head and is expected to improve both the gas barrier property and the adhesion of the peg to the HOC.

The corrosion resistance of the magnetic pole with YO amorphous gas layers of different thickness and additional gas barrier layers were investigated using air isothermal annealing processes at 280° C. for different amounts of time.

Table 1 below summarizes the pole oxidation results for the YO layers with different thickness.

TABLE 1

| Layers | 280° C./ 0.5 H | Failure mode | 280°/ 1 H | Failure mode | 280° C./ 1.5 H | Failure mode | 280° C./ 4.5 H | Failure mode | 280° C./ 16.5 H | Failure mode |
|---|---|---|---|---|---|---|---|---|---|---|
| 10Å YO/ 15 Å DLC | 0 | | 0 | | | | 100 | coverage | | |
| 20 Å YO/ 15 Å DLC | 0 | | 98.21 | coverage | 100 | coverage | | | | |
| 40 Å YO/ 15 Å DLC | 17.24 | coverage | 100 | coverage | | | | | | |
| 40 Å TaO/ 15 Å DLC | 63.00 | Edge/ pitting | 100 | Pitting | 100 | Full coverage | | | | |
| 10 Å YO/ 30 Å SiO/ 15 Å DLC | 0 | | 0 | | 0 | | 0 | | 37.93 | Edge/ pitting |

As shown above, the stacks with thinner YO layers showed better resistance to pole oxidation than those with thicker layers. Also, the stack with the additional 30 Å SiO layer showed even better pole oxidation resistance, improving pole oxidation lifetime by at least 3.7 times. Stacks with thinner total layer thickness (10 Å YO/15 Å DLC) showed better gas barrier properties than those with the thicker total layer (40 Å TaO/15 Å DLC).

Possible explanations why gas barrier properties are improved by reducing YO thickness may include. 1) Film toughness increases with reduced film thickness Thinner films may have less thermal stress induced cracking, and therefore, better gas barrier property. 2) Thicker YO films may start to form a crystalline structure. The defects in the crystalline film promote the diffusion of reactive gas molecules, corresponding to decreased gas barrier properties.

Figure 6A:
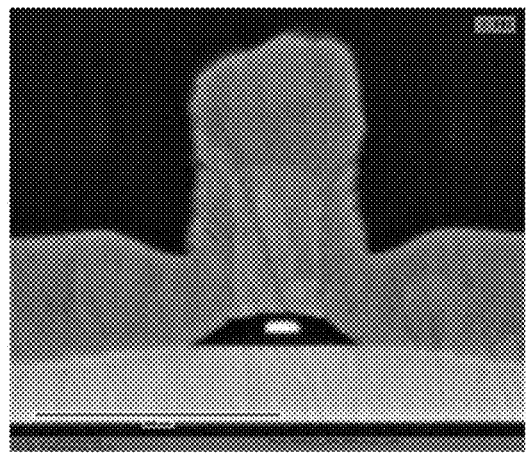
FIGS. 6A to 6C are SEM images of illustrative NFTs having various layers formed thereon after annealing.
Figure 6B:
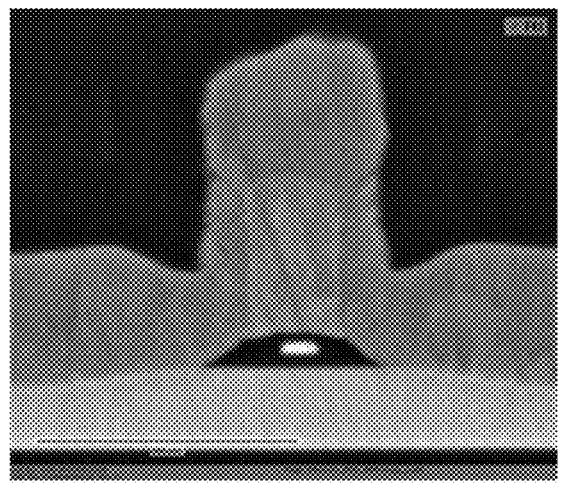
Figure 6C:
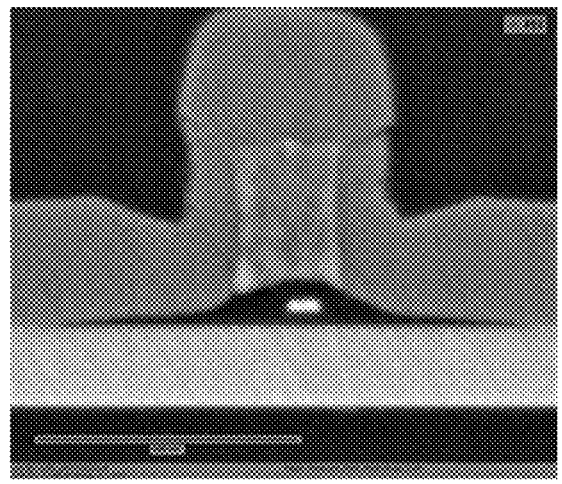
Figure 7A:
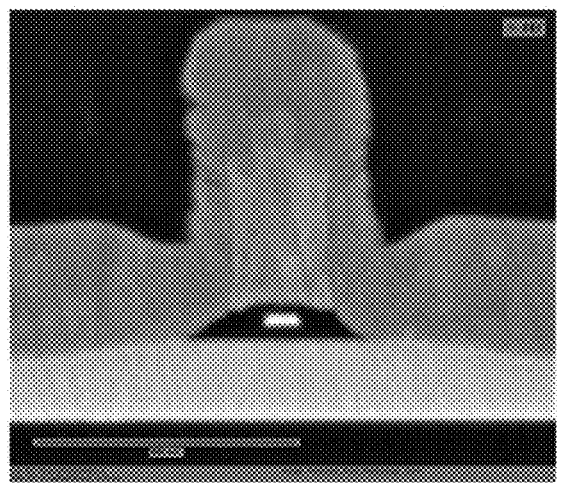
FIGS. 7A to 7D are SEM images of illustrative NFTs having various layers formed thereon after annealing.
Figure 7B:
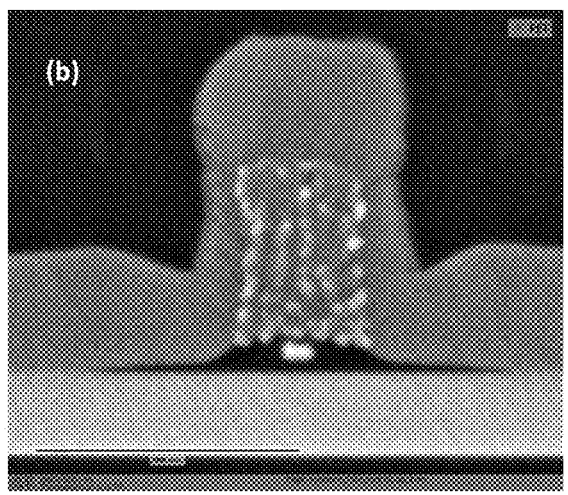
Figure 7C:
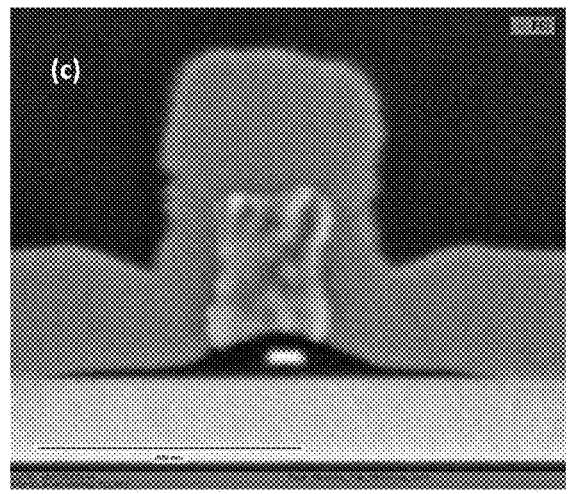
Figure 7D:
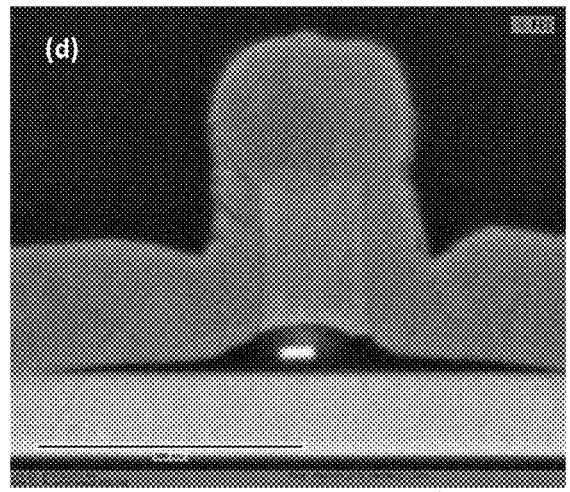

FIGS. 6A, 6B and 6C show typical scanning electron microscope (SEM) images for the heads with 10 Å YO/15 Å DLC (FIG. 6A), 20 Å YO/15 Å DLC (FIG. 6B) and 40 Å YO/15 Å DLC (FIG. 6C), respectively. The three heads were tested at 280° C. for 0.5 h. No heads with either 10 Å YO/15 Å DLC or 20 Å YO/15 Å DLC showed pole oxidation, but 17% of the heads with 40 Å YO/15 Å DLC showed pole oxidation.

FIGS. 7A, 7B, 7C and 7D show typical SEM images for heads with 10 Å YO/15 Å DLC (FIG. 7A), 20 Å YO/15 Å DLC (FIG. 7B), 40 Å YO/15 Å DLC (FIG. 7C), and 10 Å YO/30 Å AlO/15 Å DLC (FIG. 7D), respectively. The four heads were tested at 280° C. for 1 h. 98% of the heads with 20 Å YO/15 Å DLC showed pole oxidation, but 100% heads with 40 Å YO/15 Å DLC showed serious complete pole oxidation. No heads with 10 Å YO/15 Å DLC and 10 Å YO/30 Å AlO/15 Å DLC showed pole oxidation.

All scientific and technical terms used herein have meanings commonly used in the art unless otherwise specified. The definitions provided herein are to facilitate understanding of certain terms used frequently herein and are not meant to limit the scope of the present disclosure.

As used in this specification and the appended claims, "top" and "bottom" (or other terms like "upper" and "lower") are utilized strictly for relative descriptions and do not imply any overall orientation of the article in which the described element is located.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise. The term "and/or" means one or all of the listed elements or a combination of any two or more of the listed elements.

As used herein, "have", "having", "include", "including", "comprise", "comprising" or the like are used in their open ended sense, and generally mean "including, but not limited to". It will be understood that "consisting essentially of", "consisting of", and the like are subsumed in "comprising" and the like. For example, a conductive trace that "comprises" silver may be a conductive trace that "consists of" silver or that "consists essentially of" silver.

As used herein, "consisting essentially of," as it relates to a composition, apparatus, system, method or the like, means that the components of the composition, apparatus, system, method or the like are limited to the enumerated components and any other components that do not materially affect the basic and novel characteristic(s) of the composition, apparatus, system, method or the like.

The words "preferred" and "preferably" refer to embodiments that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure, including the claims.

Also herein, the recitations of numerical ranges by endpoints include all numbers subsumed within that range (e.g., 1 to 5 includes 1, 1.5, 2, 2.75, 3, 3.80, 4, 5, etc. or 10 or less includes 10, 9.4, 7.6, 5, 4.3, 2.9, 1.62, 0.3, etc.). Where a range of values is "up to" a particular value, that value is included within the range.

Use of "first," "second," etc. in the description above and the claims that follow is not intended to necessarily indicate that the enumerated number of objects are present. For example, a "second" substrate is merely intended to differentiate from another infusion device (such as a "first" substrate). Use of "first," "second," etc. in the description above and the claims that follow is also not necessarily intended to indicate that one comes earlier in time than the other.

Thus, embodiments of devices including at least one gas barrier layer are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation.

What is claimed is:

1. A device comprising:
a near field transducer (NFT);
a write pole positioned adjacent the NFT;
an amorphous gas barrier layer positioned on at least a portion of the NFT and at least a portion of the write pole; and
a wear resistance layer positioned on at least a portion of the gas barrier layer.

2. The device according to claim 1, wherein the material of the amorphous gas barrier layer has an average grain size of not greater than 3 nm.

3. The device according to claim 1, wherein the amorphous gas barrier layer has a thickness from 0.1 nm to 10 nm.

4. The device according to claim 1, wherein the amorphous gas barrier layer comprises:
tantalum oxide (TaO), chromium oxide (CrO), titanium oxide (TiO), zirconium oxide (ZrO), yttrium oxide (YO), niobioum oxide (NbO), hafnium oxide (HfO), aluminum oxide (AlO), magnesium oxide (MgO), iron oxide (FeO), cobalt oxide (CoO), nickel oxide (NiO), or some combination thereof,
titanium nitride (TiN), zirconium nitride (ZrN), niobioum nitride (NbN), hafnium nitride (HfN), chromium nitride (CrN), or combinations thereof; or
combinations thereof.

5. The device according to claim 1, wherein the amorphous gas barrier layer comprises magnesium oxide (MgO), iron oxide (FeO), cobalt oxide (CoO), nickel oxide (NiO), indium tin oxide (ITO), or some combination thereof.

6. The device according to claim 1, wherein the amorphous gas barrier layer comprises titanium oxide (TiO), yttrium oxide (YO), or combinations thereof.

7. The device according to claim 1, wherein the amorphous gas barrier layer comprises a first amorphous gas barrier layer and a second amorphous gas barrier layer, wherein the first amorphous gas barrier layer is closer to the NFT than the second amorphous gas barrier layer.

8. The device according to claim 7, wherein the second amorphous gas barrier layer comprises silicon oxide (SiO), germanium oxide (GeO), aluminum oxide (AlO), chromium oxide (CrO), boron oxide (BO), boron nitride (BN), silicon nitride (SiN), aluminum nitride (AlN), germanium nitride (GeN), silicon oxy nitride (SiON), aluminum oxy nitride (AlON), chromium oxy nitride (CrON), germanium oxy nitride (GeON), boron oxy nitride (BON), tantalum oxy nitride (TaON), tantalum silicon oxy nitride (TaSiON), titanium oxy nitride (TiON), zirconium oxy nitride (ZrON), hafnium oxy nitride (HfON), yttrium oxy nitride (YON), yttrium silicon oxy nitride (YSiON), or combinations thereof.

9. The device according to claim 1, wherein the amorphous gas barrier layer comprises one or more network forming elements.

10. The device according to claim 9, wherein the one or more network forming elements are selected from: silicon (Si), germanium (Ge), boron (B), phosphorus (P), aluminum (Al), and chromium (Cr).

11. The device according to claim 9, wherein the one or more network forming elements are present in the amorphous gas barrier layer in an amount from 5 atomic percent (at %) to 90 at %.

12. The device according to claim 1 further comprising at least one of a NFT adhesion layer and a wear resistance adhesion layer, wherein the NFT adhesion layer is positioned between the NFT and the amorphous gas barrier layer and the wear resistance adhesion layer is positioned between the amorphous gas barrier layer and the wear resistance layer.

13. The device according to claim 1 further comprising both a NFT adhesion layer and a wear resistance adhesion layer, wherein the NFT adhesion layer is positioned between the NFT and the amorphous gas barrier layer and the wear resistance adhesion layer is positioned between the amorphous gas barrier layer and the wear resistance layer.

14. A device comprising:
a near field transducer (NFT);
a write pole positioned adjacent the NFT;
an amorphous gas barrier layer positioned on at least a portion of the NFT and a least a portion of the write pole;
a NFT adhesion layer positioned between the NFT and the amorphous gas barrier layer; and
a wear resistance layer positioned on at least a portion of the gas barrier layer.

15. The device according to claim 14, wherein the material of the amorphous gas barrier layer has an average grain size of not greater than 3 nm.

16. The device according to claim 14, wherein the amorphous gas barrier layer has a thickness from 0.1 nm to 10 nm.

17. The device according to claim 14, wherein the amorphous gas barrier layer comprises:
tantalum oxide (TaO), chromium oxide (CrO), titanium oxide (TiO), zirconium oxide (ZrO), yttrium oxide (YO), niobioum oxide (NbO), hafnium oxide (HfO), aluminum oxide (AlO), magnesium oxide (MgO), iron oxide (FeO), cobalt oxide (CoO), nickel oxide (NiO), or some combination thereof,
titanium nitride (TiN), zirconium nitride (ZrN), niobioum nitride (NbN), hafnium nitride (HfN), chromium nitride (CrN), or combinations thereof; or
combinations thereof.

18. The device according to claim 14, wherein the amorphous gas barrier layer comprises titanium oxide (TiO), yttrium oxide (YO), or combinations thereof.

19. A method comprising:
forming a write pole;
forming a near field transducer (NFT);
forming an amorphous gas barrier layer on at least a portion of the NFT and at least a portion of the write pole by depositing a metal layer and subsequently oxidizing at least part of the metal layer, the metal layer comprising: tantalum (Ta), titanium (Ti), chromium (Cr), zirconium (Zr), yttrium (Y), magnesium (Mg), niobium (Nb), hafnium (Hf), aluminum (Al), and combinations thereof; and
forming a wear resistance layer on the gas barrier layer.

20. The method according to claim 19 further comprising repeating the steps of depositing a metal and subsequently oxidizing at least part of the metal layer.

* * * * *